United States Patent [19]

Weissner et al.

[11] 4,251,091
[45] Feb. 17, 1981

[54] PASSIVE VEHICLE SAFETY BELT

[75] Inventors: Rüdiger Weissner; Wilfried Köke, both of Wolfsburg; Günter Hoffmann, Gifhorn, all of Fed. Rep. of Germany

[73] Assignee: Volkswagenwerk Aktiengesellschaft, Fed. Rep. of Germany

[21] Appl. No.: 957,467

[22] Filed: Nov. 3, 1978

[30] Foreign Application Priority Data

Nov. 11, 1977 [DE] Fed. Rep. of Germany ....... 2750440

[51] Int. Cl.³ .............................................. B60R 21/10
[52] U.S. Cl. ............................. 280/804; 242/107.4 A; 280/806
[58] Field of Search ................ 180/270; 280/806, 804, 280/803, 808, 807; 242/107.4 R, 107.4 A

[56] References Cited

U.S. PATENT DOCUMENTS

| 3,771,814 | 11/1973 | Hahn | 280/803 |
| 3,822,760 | 7/1974 | Lindblad | 280/804 |
| 4,007,802 | 2/1977 | de Rosa | 242/107.4 A |
| 4,040,645 | 8/1977 | Giffen et al. | 280/803 |
| 4,061,365 | 12/1977 | Nagano | 280/804 |
| 4,090,735 | 5/1978 | Czernakowski | 242/107.4 A |

FOREIGN PATENT DOCUMENTS

| 2350328 | 4/1975 | Fed. Rep. of Germany | 242/107.4 A |
| 2355562 | 5/1975 | Fed. Rep. of Germany | 242/107.4 A |
| 2529693 | 1/1977 | Fed. Rep. of Germany | 180/270 |
| 2326946 | 5/1977 | France | 242/107.4 R |

Primary Examiner—David M. Mitchell
Attorney, Agent, or Firm—Brumbaugh, Graves, Donohue & Raymond

[57] ABSTRACT

A passive safety belt device for a motor vehicle is provided with a belt winding spool adjacent a vehicle seat connected to one end of a safety belt and a slide moving in a track adjacent the vehicle door and holding the other end of the safety belt. The belt winding spool is provided with an inertially operated locking device. Means are provided for retaining the locking device in the unlocked position and releasing the locking device only when the slide is in a position for restraining a passenger in the vehicle seat.

5 Claims, 4 Drawing Figures

PASSIVE VEHICLE SAFETY BELT

BACKGROUND OF THE INVENTION

This invention relates to vehicle safety belts and particularly to passive safety belt devices which are automatically applied across a vehicle occupant.

According to a known passive safety belt arrangement, one end of the belt is wound on an automatic winding spool adjacent the vehicle seat on the side of the seat away from the vehicle door. The other end of the belt is carried in a slide carriage which moves in a track attached to the frame of the vehicle adjacent the vehicle door. The slide carriage moves in the track between a restraining position, in which the belt is applied across a vehicle occupant in the seat, and a second release position in which the belt is lifted off the occupant. Under ordinary circumstances, the winding spool operates automatically to take up or pay out the belt as required by the movement of the carriage or the passenger. The winding spool is provided with an inertially operated locking device having an inertial mass which displaces and locks the winding spool when the vehicle undergoes sudden acceleration or overturns. Locking of the winding spool causes the devices to restrain the passenger thereby preventing serious injury.

There have been known prior art devices which include blocking devices for keeping the inertial locking mechanism from locking the belt winding spool under certain conditions. One such device, used in an arrangement wherein the safety belt is attached to the vehicle door at one end, prevents locking of the belt winding devices when the vehicle door is open. This prevents a condition wherein the the locked spool prevents opening of the vehicle door. Such devices, described in German Patent Publications Nos. 23 50 328 and 23 55 562, operate either by means of a mechanical lever connected to the door lock or by the use of an electrical door contact switch.

While safety belt devices of the type to which the present invention is applicable, wherein the belt is not attached to the vehicle door, are not likely to become jammed in a position which would prevent opening of the door, it is undesirable to have the winding spool locked in a manner which prevents removal of the safety belt to its passenger release position. Further, where the blocking device is activated by the vehicle door, there is substantial risk that a collision induced deformation of the vehicle door will cause a constant disengagement of the locking device thereby rendering the safety belt inoperative in the event of a subsequent collision.

It is therefore an object of the present invention to provide a new and improved passive safety belt device wherein the belt winding spool locking device is rendered inoperative except when the belt is in the passenger restraining position.

SUMMARY OF THE INVENTION

The present invention is used in connection with a passive safety belt for a motor vehicle wherein there is provided a safety belt having a first end wound on a automatic winding spool adjacent a vehicle seat. The spool is provided with an inertially activated locking device. A second end of the belt is connected to a slide carriage which is movable along a track between a first restraining position and a second release position. According to the invention, there is provided means for retaining the inertial locking device in the unlocked position and for releasing the inertial locking device only when the slide carriage is in the firs restraining position.

In a preferred embodiment, the means for retaining and releasing the inertial locking device includes blocking means operative on the locking device, activating means including a stop arranged to be engaged and moved by the slide carriage in opposition to a spring and means for operatively interconnecting the blocking means and the activating means. The interconnecting means may include a Bowden cable, and electrical control, or a fluid control system.

For a better understanding of the present invention, together with other and further objects, reference is made to the following description, taken in conjunction with the accompanying drawings, and its scope will be pointed out in the appended claims.

DESCRIPTION OF THE INVENTION

Figure 1:
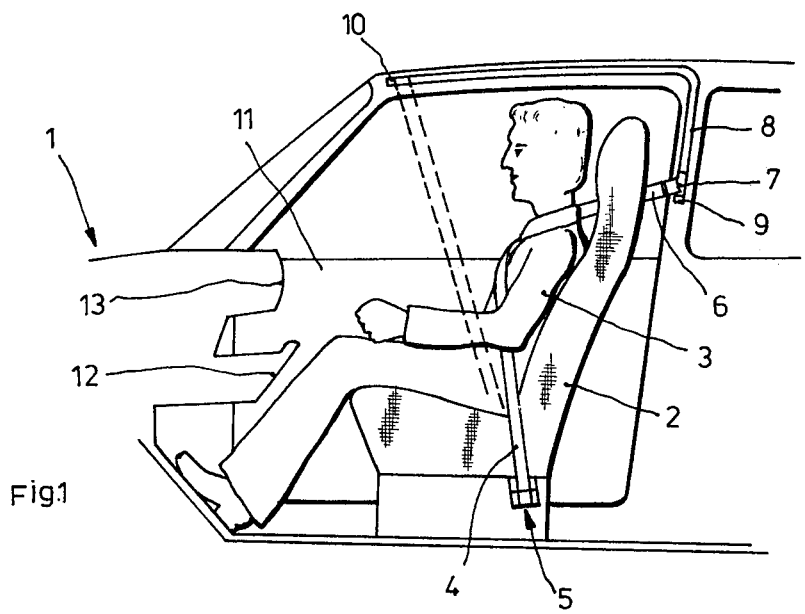
FIG. 1 is a cut-away view of a motor vehicle illustrating a passive safety belt arrangement.

In the FIG. 1 drawing, there is shown a cut-away view of a motor vehicle 1 which includes a vehicle seat 2 occupied by a passenger 3. A passive safety belt arrangement is provided in connection with the vehicle seat 2. The safety belt arrangement includes an automatically operated diagonal shoulder belt 4, which operates in conjunction with an energy absorbing flexible knee cushion 12 arranged below dashboard 13.

The lower end of the diagonal shoulder belt 4 is wound on a belt winding spool 5 which is attached onto or adjacent vehicle seat 2 on the side of the seat away from vehicle door 11. The upper end 6 of safety belt 4 is fastended to a slide carriage 7 which moves along a track 8 which is mounted to the frame of the vehicle around the vehicle door 11. The safety devices includes apparatus for automatically moving slide carriage 7 in track 8 between a passenger release position 10 and a passenger restraining position 9. The displacement drive may be electric, hydraulic or pneumatic and operate the slide carriage in opposition to a return spring. Such means are typically arranged to move the carriage 7 to position 9 when the vehicle engine is started.

Figure 2:
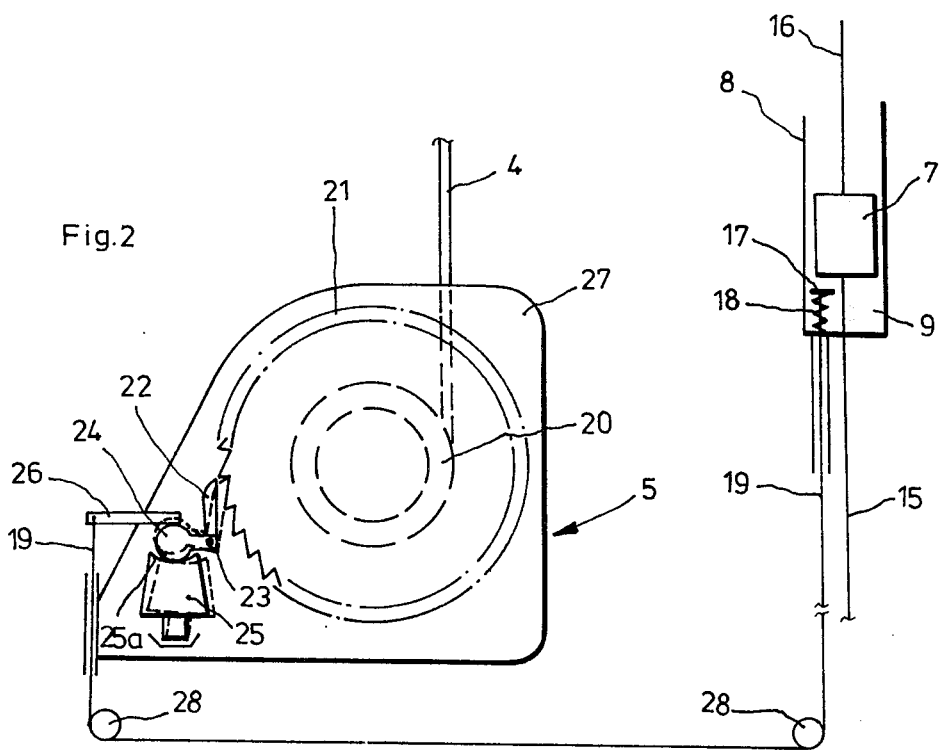
FIG. 2 illustrates the safety belt winding spool locking mechanism constructed in accordance with the present invention and having a cable control system.

FIG. 2 is a detailed view of the belt winding spool 5. A drum 20 is provided mounted on a housing 27 and loaded by a spiral spring, which is not shown, to automatically wind in a direction which takes up the safety belt and forms a belt roll. A toothed disk 21 is mounted on winding drum 20 and arranged to operate in connection with ratchet pawl 22. Ratchet pawl 22 is mounted on lever 24 which has pivot axis 23, and is arranged to prevent the unwinding of belt 4 when pawl 22 engages toothed disk 21. Inertial mass 25, arranged in the shape of a pendulum, will be deflected from its rest position in the event of a sudden vehicle acceleration or overturning of the vehicle. When deflected out of its rest position as shown by the dotted lines, the cup-shaped upper surface 25a of inertial mass 25 engages the ball-shaped end of lever 24, moves the ball-shaped end upward, and causes pawl 22 to engage the toothed disk 21 and thereby block unwinding of the belt.

In accordance with the invention, there is provided a blocking lever 26 which upon actuation engages lever 24 and maintains the lever in its rest position wherein pawl 22 is disengaged from toothed disk 21. In the embodiment illustrated in FIG. 2, blocking lever 26 is operated by Bowden cable 19 which is connected to stop 17 which is arranged to engage slide carriage 7 in its restraining position 9 in guide 8. Stop 17 is held in upward position by spring 18 which causes the engagement of blocking lever 26. When slide carriage 7 engages stop 17 and moves it to the downward position, cable 19 moves blocking lever 26 out of engagement with lever 24. Pulleys 28 are provided for guiding the cable between stop 17 and lever 26.

The blocking arrangement of FIG. 2 causes blocking lever 26 to be urged against lever 24 and hold ratchet pawl 22 in the disengaged rest position except when slide carriage 7 is driven by connecting cable 15 into the extreme end position 9 whereat belt 4 is applied across and restrains the vehicle passenger. When carriage 7 is in the end position 9 cable 19 moves blocking lever 26 out of the lever engaging position to release lever 24 and permit the lever and pawl to act only under the influence of inertial mass 25 and thereby operate to lock the winding spool 5 in the event of sudden acceleration or vehicle overturning. When the safety belt 4 is returned by slide carriage 7 to the passenger release position 10, for example by a return spring connected to slide 7 by cable 16, stop 17 moves under the influence of spring 18 into its rest position causing cable 19 to engage blocking lever 26 and prevent pawl 22 from locking spool 5.

Figure 3:
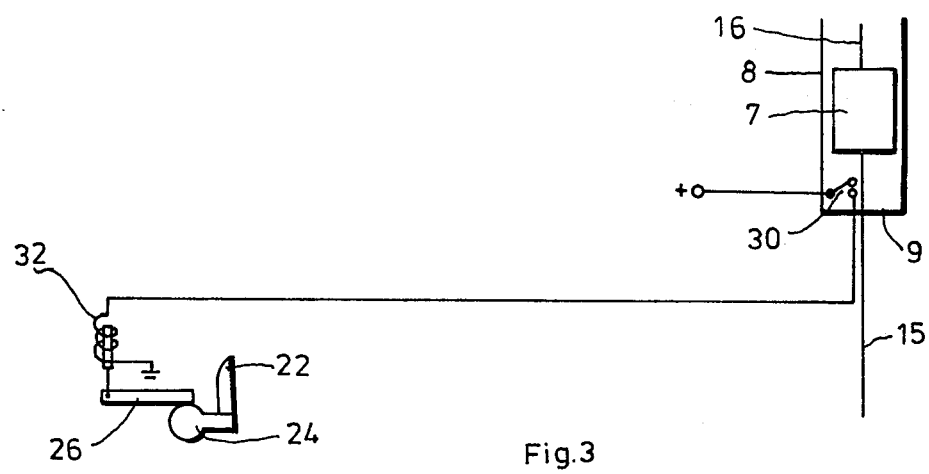
FIG. 3 illustrates an electrical control system useable with the FIG. 2 locking mechanism.
Figure 4:
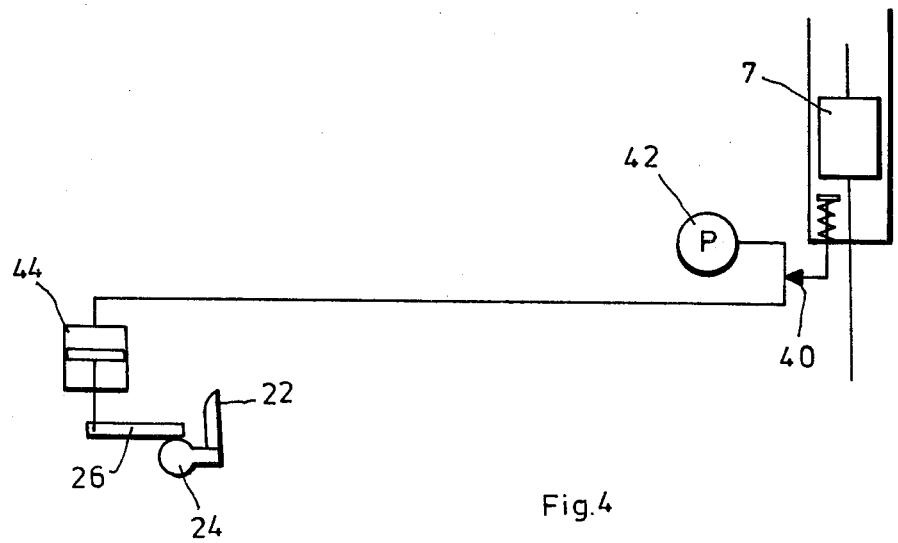
FIG. 4 illustrates a fluid pressure control system useable with the FIG. 2 locking mechanism.

Those skilled in the art will recognize that other mechanisms may be used for blocking operation of the lever 24 and pawl 22. FIG. 3 illustrates an arrangement wherein slide carriage 7 closes an electrical switch 30 which causes solenoid 32 to move lever 26 out of the engaged position. Likewise, FIG. 4 shows an arrangement wherein slide 7 operates a pneumatic switch 40 which connects vacuum pump 42 or a vacuum accumulator to cylinder 44. The vacuum causes the piston in cylinder 44 to move blocking lever 26 out of engagement. Those skilled in the art will recognize that hydraulic, pneumatic or other fluid control systems may also be used.

While there have been described what are believed to be the preferred embodiments of the invention, those skilled in the art will recognize that other and further modifications may be made thereto without departing from the spirit of the invention, and it is intended to claim all such embodiments as fall within the true scope of the invention.

We claim:

1. In a passive safety belt for a motor vehicle, wherein there is provided a safety belt having a first end wound on an automatic winding spool adjacent a vehicle seat, said spool being provided with an inertially operated locking device, and a second end connected to a slide carriage, said slide carriage being moveable along a track between a first passenger restraining position and a second passenger release position, the improvement wherein there is provided means for retaining said inertial locking device in the unlocked position and for releasing said inertial locking device only when said slide carriage is in said first position said retaining and releasing means including activating means engaged by said slide carriage in said first position for releasing said inertial locking device.

2. The improvement specified in claim 1 wherein said means for retaining and releasing said inertial locking device includes blocking means for engaging and preventing operation of said locking device, said activating means including a stop arranged to be engaged and moved by said slide carriage in opposition to a spring, and means for operatively interconnecting said blocking means and said activating means.

3. The improvement specified in claim 2 wherein said blocking means comprises a blocking lever and said interconnecting means comprises a Bowden cable.

4. The improvement specified in claim 1 or claim 2 wherein said retaining and releasing means includes an electrical control system.

5. The improvement specified in claims 1 or 2 wherein said retaining and releasing means includes a fluid control system.

* * * * *